US 9,892,063 B2

(12) United States Patent
Jones, III

(10) Patent No.: US 9,892,063 B2
(45) Date of Patent: Feb. 13, 2018

(54) CONTENTION BLOCKING BUFFER

(71) Applicant: Advanced Micro Devices, Inc., Sunnyvale, CA (US)

(72) Inventor: William Evan Jones, III, Fort Collins, CO (US)

(73) Assignee: Advanced Micro Devices, Inc., Santa Clara, CA (US)

(*) Notice: Subject to any disclaimer, the term of this patent is extended or adjusted under 35 U.S.C. 154(b) by 957 days.

(21) Appl. No.: 13/686,588

(22) Filed: Nov. 27, 2012

(65) Prior Publication Data
US 2014/0149703 A1 May 29, 2014

(51) Int. Cl.
G06F 13/00 (2006.01)
G06F 12/14 (2006.01)
G06F 9/52 (2006.01)
G06F 13/16 (2006.01)

(52) U.S. Cl.
CPC ......... *G06F 12/1441* (2013.01); *G06F 9/526* (2013.01); *G06F 12/1458* (2013.01); *G06F 13/1673* (2013.01); *G06F 2209/521* (2013.01)

(58) Field of Classification Search
CPC ................... G06F 12/1458; G06F 13/1673
USPC .............................. 711/158; 710/56; 713/154
See application file for complete search history.

(56) References Cited

U.S. PATENT DOCUMENTS

| | | | | |
|---|---|---|---|---|
| 5,563,633 A * | 10/1996 | Parsons | ......................... | 345/547 |
| 6,763,437 B1 * | 7/2004 | Nguyen et al. | ............... | 711/147 |
| 6,996,645 B1 * | 2/2006 | Wiedenman et al. | ........ | 710/107 |
| 2006/0004998 A1 * | 1/2006 | Saha et al. | .................... | 712/245 |
| 2006/0092944 A1 * | 5/2006 | Wingard et al. | ........... | 370/395.2 |
| 2006/0161740 A1 * | 7/2006 | Kottapalli et al. | ............ | 711/152 |
| 2007/0198785 A1 * | 8/2007 | Kogge et al. | ................ | 711/154 |
| 2008/0162873 A1 * | 7/2008 | Zimmer et al. | ................. | 712/22 |
| 2009/0125519 A1 * | 5/2009 | Robison et al. | .................. | 707/8 |
| 2011/0197031 A1 * | 8/2011 | Aho et al. | ..................... | 711/130 |
| 2011/0202613 A1 * | 8/2011 | Craig et al. | .................. | 709/206 |
| 2013/0111141 A1 * | 5/2013 | Kessler | .............. | G06F 12/0813 711/130 |
| 2013/0290583 A1 * | 10/2013 | Dice et al. | .................... | 710/200 |

OTHER PUBLICATIONS

Mounes-Toussi et al., "Write Buffer Design for Cache-Coherent Shared-Memory Multiprocessors", IEEE, 1995, pp. 506-511.*

* cited by examiner

*Primary Examiner* — Reba I Elmore

(57) ABSTRACT

In response to a processor receiving data associated with a shared memory location, a contention blocking buffer stores a memory address of the shared memory location. In response to a probe seeking to take ownership of the shared memory location, the contention blocking buffer determines if the memory address indicated by the probe is stored at the contention blocking buffer. If so, the contention blocking buffer blocks the probe, thereby preventing another processor from taking ownership of the shared memory location.

13 Claims, 4 Drawing Sheets

CONTENTION BLOCKING BUFFER

BACKGROUND

Field of the Disclosure

The present disclosure generally relates to multiprocessor devices, and more particularly to memory contention at multiprocessor devices.

Description of the Related Art

In a multiprocessor device, processor cores typically share at least one region of system memory. Memory contention can arise when different processor cores attempt to access the same memory location concurrently. In order to avoid errors resulting from memory contention, software executing at the multiprocessor device can implement a synchronization scheme whereby, in order to access a shared memory location at a shared memory region, a processor core must first obtain temporary ownership of the shared memory location from a home agent, and then set a semaphore to lock the shared memory region. While the shared memory location is locked, the shared memory region cannot be written by another processor core.

Locking a shared memory location typically requires at least two operations by a processor core: a check operation to see whether a lock indicator is set; and, if the lock indicator is not set, a lock operation to set the lock. However, when multiple processor cores attempt to lock the shared memory region concurrently, the execution of instructions at each processor core is delayed as each processor core attempts to complete the operations to secure a lock on the shared memory region, thus reducing processing efficiency.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-4 illustrate techniques for increasing processing efficiency by employing a contention blocking buffer to prevent a processor core from losing ownership of a shared memory location while the processor core is attempting to modify a semaphore or otherwise process the shared memory location. In response to the processor core receiving data associated with the shared memory location, the contention blocking buffer stores the memory address of the shared memory location. In response to probes seeking to take ownership of the shared memory location, the contention blocking buffer determines if the memory address indicated by the probe is stored at the contention blocking buffer. If so, the contention blocking buffer blocks the probe, thereby preventing another processor core from taking ownership of the shared memory location. A processor core is thus given time to modify a semaphore or otherwise use the shared memory location before ownership is transferred to another processor core. For example, the processor core is given time to set a semaphore to lock the shared memory location. Memory addresses are removed from the contention blocking buffer after a period of time to ensure that other processor cores are eventually able to access the shared memory location. For example, once the software that obtained the lock has completed its operations on the shared memory location, the software can release the lock so that the shared memory location can be accessed by software executing at other processor cores.

Figure 1:
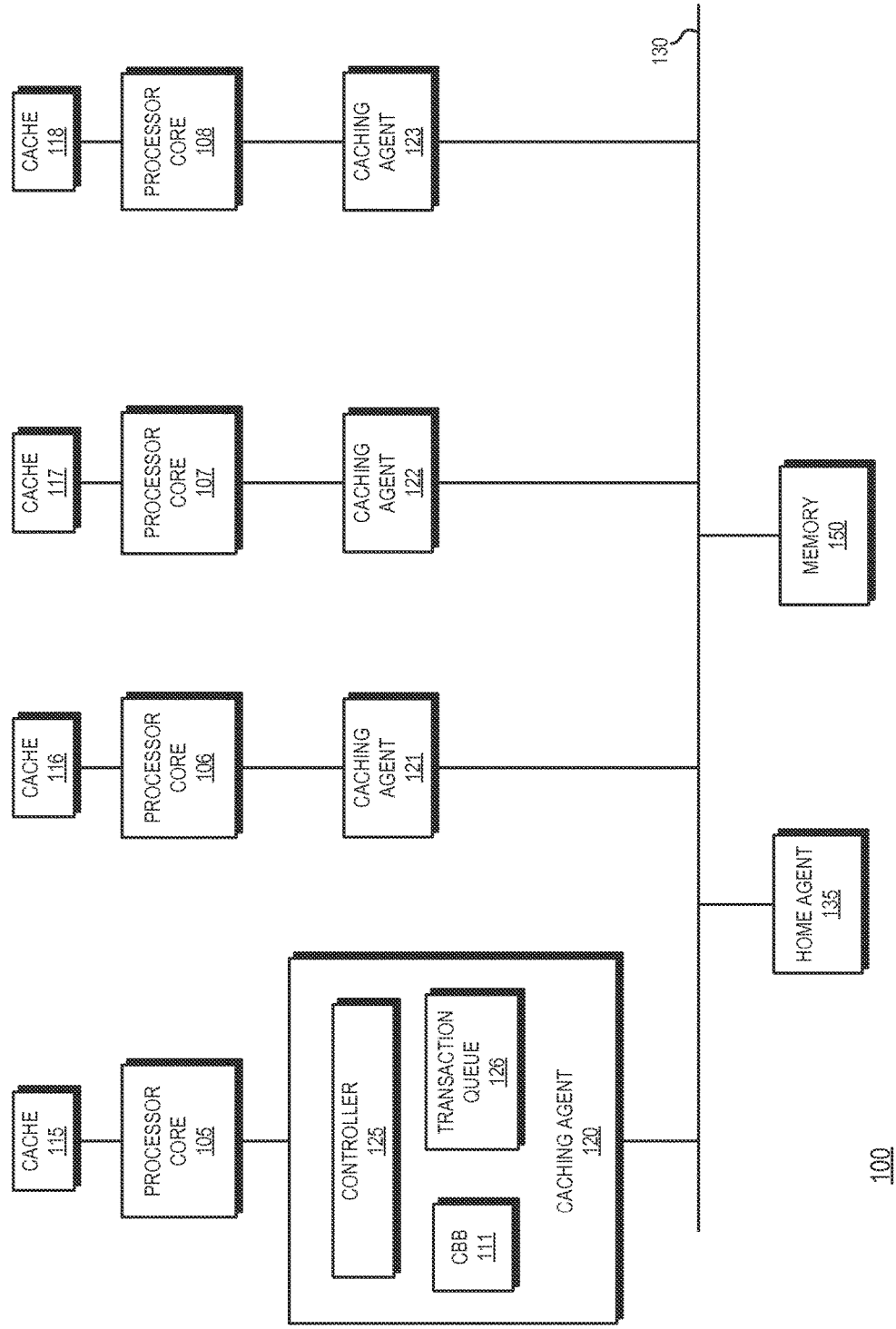
FIG. 1 is a block diagram of a processing system implementing memory contention blocking in accordance with some embodiments.

FIG. 1 illustrates a block diagram of a processing system 100 employing contention blocking buffers to reduce memory contention in accordance with some embodiments of the present disclosure. In the illustrated example, the processing system 100 includes multiple processor cores (e.g. processor cores 105, 106, 107, and 108) connected to corresponding caches (e.g. caches 115, 116, 117, and 118). Each of the processor cores 105-108 is connected to a corresponding caching agent (depicted as cache agents 120, 121, 122, and 123) and each caching agent is connected to a communication fabric 130. In the example of FIG. 1, the caching agent 120 is illustrated as separate from the processor core; however, in some embodiments, the caching agent 120 may be integrated into the processor core. Also connected to the communication fabric 130 are a home agent 135 and a memory 150. In the example of FIG. 1, the communication fabric 130 is illustrated as a bus; however, in some embodiments the communication fabric 130 can be any communication medium that supports transfers of data in a processing system, such as a HyperTransport fabric or QuickPath Interconnect fabric.

In some embodiments the processor cores 105-108 are incorporated into a single processor die. In some embodiments, the processor cores 105-108 are incorporated into different processors. For example, processor cores 105 and 106 can be incorporated into one processor while processor cores 107 and 108 are incorporated into a different processor. In addition, in some embodiments the home agent 135 is incorporated into a processor that includes one or more of the processor cores 105-108. For example, the home agent 135 can be part of a northbridge or other memory interface of a processor.

The memory 150 is a memory device, such as one or more random access memory (RAM) modules, flash memory, a hard disk drive, and the like, or any combination thereof. In some embodiments, the processor cores 105-108 are incorporated into a processor and the memory 150 is external to the processor and connected to the communication fabric 130 via one or more traces or other connections. The memory 150 stores data at addressable regions referred to as memory locations, whereby each memory location is identified by a corresponding memory address. The processing system 100 implements a data management scheme whereby data can be moved between different portions of the processing system 100, but no matter its location the data is identified by the address of its corresponding memory location. To illustrate, the processor cores 105-108 each include a corresponding instruction pipeline that executes sets of instructions in order to carry out designated tasks. In the course of executing instructions, the processor cores 105-108 generate memory access requests (read and write requests) to request transfer of data to and from the corresponding processor core. The memory access requests identify the data associated with the request by the memory address corresponding to the memory location where the data is stored.

The processor cores 105-108 employ caching to improve processing efficiency, whereby each of the cores 105-108 stores data (which can be instruction data, data operands of instructions, or other data) that is likely to be used by the respective processor core in the near future from the memory 150 to the corresponding cache. Each of the caches 115-118 thus stores a subset of the data stored at the memory 150. Because the processor cores 105-108 can access their corresponding cache more quickly than they can access the data at the memory 150, the transfer of data to the caches enhances processing efficiency. To manage the data stored in the corresponding cache, each processor core attempts to satisfy its memory access requests at its corresponding cache first. If the cache does not store valid data associated with the memory address targeted by the memory access request, the processor core attempts to satisfy the memory access request at the memory 150, as described further below. Upon receiving data responsive to the memory access request, the processor core stores the data at its corresponding cache.

The caching agents 120-123 are employed to assist the corresponding processor core with management of memory access requests and their provision to the memory 150. Each of the caching agents 120-123 includes a controller (e.g. controller 125 of the caching agent 120), a transaction queue (e.g. transaction queue 126 of the caching agent 120), and a contention blocking buffer (CBB) (e.g. CBB 111 of the caching agent 120). The transaction queue 126 is configured to store information representing memory access requests provided by the processor core 105. The controller 125 is configured to monitor the communication fabric 130 for responses to the memory access requests and to provide the responses to the processor core 105.

Because the processor cores 105-108 execute instructions concurrently, it is possible that multiple ones of the processor cores 105-108 may seek to concurrently process data associated with the same memory location. For example, one processor core can seek to retrieve data at a particular memory location of the memory 150 while data associated with that memory location is stored at the cache of another processor core. If both processor cores were to concurrently modify the data associated with the memory location (e.g. modifying a copy of the data at their associated cache) data coherency would be lost, resulting in errors at the processor cores. The home agent 135 thus is configured to manage memory accesses to the memory 150 to reduce the likelihood that data coherency will be lost. In particular, the home agent 135 ensures that only one of the processor cores 105-108 is able to modify data associated with a particular memory location at a time. As used herein, the granting of permission to a processor core to modify data associated with a memory location is referred to as assigning or granting "ownership" of the memory location to that processor core.

In some embodiments, the processor cores 105-108 implement an Instruction Set Architecture (ISA) that employs atomic operations, whereby an atomic operation instituted by one of the processor cores appears as an instantaneous operation with respect to the other processor cores. For example, the processor cores 105-108 can employ the x86 Compare and Exchange (cmpxchg) instruction, which compares a value in a general-purpose register with a value in a specified memory location. If the values match, then the data in the memory location is updated. Because the cmpxchg instruction is an atomic operation that appears instantaneous to other processor cores, the other processor cores cannot modify the memory location while the cmpxchg instruction is being executed, thus reducing the likelihood of harmful data contention.

In some embodiments, software executing at the processor cores 105-108 use atomic operations to implement semaphores, which control access by multiple processes to shared resources (for instance, a shared data structure). A portion of software that accesses a shared resource is referred to as a critical section. The atomic instructions that control access to these semaphores are referred to as semaphore instructions or locking instructions.

To illustrate, processor core 105 can be preparing to execute a critical section of code to access a shared resource. Accordingly, the processor core tests the value of a semaphore associated with the shared resource. If the semaphore is not set (in a clear state), indicating that no processor is currently allowed to access the shared resource, then the processor core 105 uses an atomic operation to set the semaphore and initiates execution of the critical section of code. If the semaphore is set, indicating that a different processor core is allowed to access the shared resource, then the processor core 105 does not initiate execution of the critical section of code, and instead continues to periodically test the semaphore until it is in a clear state, indicating that the shared resource is not currently being accessed. Accordingly, the processor cores 105-108 employ two operations used to obtain a semaphore—a test operation to check if a semaphore is not owned, and then an atomic test/set operation to actually obtain ownership.

In addition, to maintain memory coherency between the processor cores 105-108, the home agent 135 implements a coherency scheme to ensure that the processor cores 105-108 do not concurrently modify a particular memory location. To illustrate, in response to receiving a memory access request the home agent 135 is configured to determine if the memory access request seeks to only to read the data targeted by the memory access request or to modify the data. If the memory access request only seeks to read the data, the home agent 135 sends messages, referred to as probes, to each of the processor cores 105-108 to determine if any of the caches 115-118 stores modified data associated with the memory location (i.e. data that has been modified since it was retrieved from the memory 150). If so, the home agent 135 requests the data from the cache that stores the modified data and provides it to the processor core that sent the memory access request. The home agent 135 can also send a memory access request to store the data at the memory 150, ensuring the memory 150 has an up-to-date copy of the data at the memory location. If the memory access request seeks to modify the data, the home agent 135 sends probes to each of the processor cores 105-108 to determine if any of the cores has exclusive ownership of the memory location. If not, the home agent indicates to the processor core that generated the memory access request that it has been granted exclusive ownership. In some embodiments the exclusive or shared ownership characteristic of a memory location is indicated by coherency control data at the caches 115-118.

Exclusive ownership of a particular memory location by a processor core does not by itself establish ownership of the semaphore associated with the memory region that includes the memory location. This allows semaphores to be employed to protect memory regions or other resources from concurrent modification by different software processes executing at the processor cores 105-108.

The coherency scheme implemented by the home agent 135 and the semaphore scheme implemented by the processor cores 105-108 can work in conjunction to reduce memory contention. For example, with respect to the semaphore locking procedure described above, the testing operation of the semaphore can be instituted when the semaphore memory location is in a shared coherency state. In response to determining the semaphore is in a clear state, the processor core seeking to lock the semaphore requests exclusive ownership of the semaphore memory location. Once it obtains exclusive ownership, the processor core institutes the atomic test/set operation. This ensures that two processor cores do not attempt concurrent test/set operations on a particular semaphore.

However, processing inefficiencies can result when multiple ones of the processor cores 105-108 attempt to obtain a semaphore stored at a particular memory location. This can be illustrated by way of an example where processor cores 106 and 107 each seek to obtain a semaphore located at a memory location designated as "Location A." The sequence of events can proceed as follows: the home agent 135 receives a memory access request for Location A from the processor core 106. In response to determining, via sending out and receiving responses to a set of probes, that Location A is not owned by another processor core, the home agent 135 grants ownership of the memory location to processor core 106. In response to processor core 106 receiving the data for that memory location, it determines that the semaphore contained at that memory location is unowned. So, the processor core 106 initiates a locking operation to obtain the semaphore. However, while processor core 106 is generating the locking operation, the processor core 107 can seek to take ownership of Location A by sending a memory access request for Location A to home agent 135. In response, the home agent 135 sends out probes to determine if memory Location A is owned by another processor core. However, processor core 106 has not yet stored to Location A (to obtain the semaphore) at the cache 116. The probes sent by home agent 135 take ownership of Location A away from processor core 106, and give ownership to processor core 107. Processor core 107, in turn, sees that the semaphore is unowned, and initiates its own locking operation to lock location A. This process can continue, with all processors in a system receiving ownership of an unowned semaphore, but being unable to actually obtain the semaphore. This reduces processing efficiency.

In some embodiments, to avoid this wasted effort, the caching agents 120-123 employ their associated CBBs to reduce the likelihood that memory contention will reduce processing performance. To illustrate using the example of caching agent 120, in response to receiving data responsive to a memory access request, the controller 125 stores the memory address for the memory access request at the CBB 111. In response to receiving a probe from the home agent 135, the controller 125 determines if the CBB 111 stores the memory address indicated by the probe. If so, the controller 125 delays processing of the probe for some period of time. This gives the processor core time to execute multiple instructions which access/modify the data at the memory location.

In some embodiments, the controller 125 includes a set of timers, whereby one of the timers in the set is initiated in response to storing a memory address at the CBB 111. In response to a timer reaching a threshold value (referred to as expiration of the timer), indicating a particular period of time is elapsed, the controller 125 removes or invalidates the corresponding memory address from the CBB 111, so that probes to the memory location of that memory address are no longer blocked. In some embodiments, the threshold is a programmable value.

Figure 2:
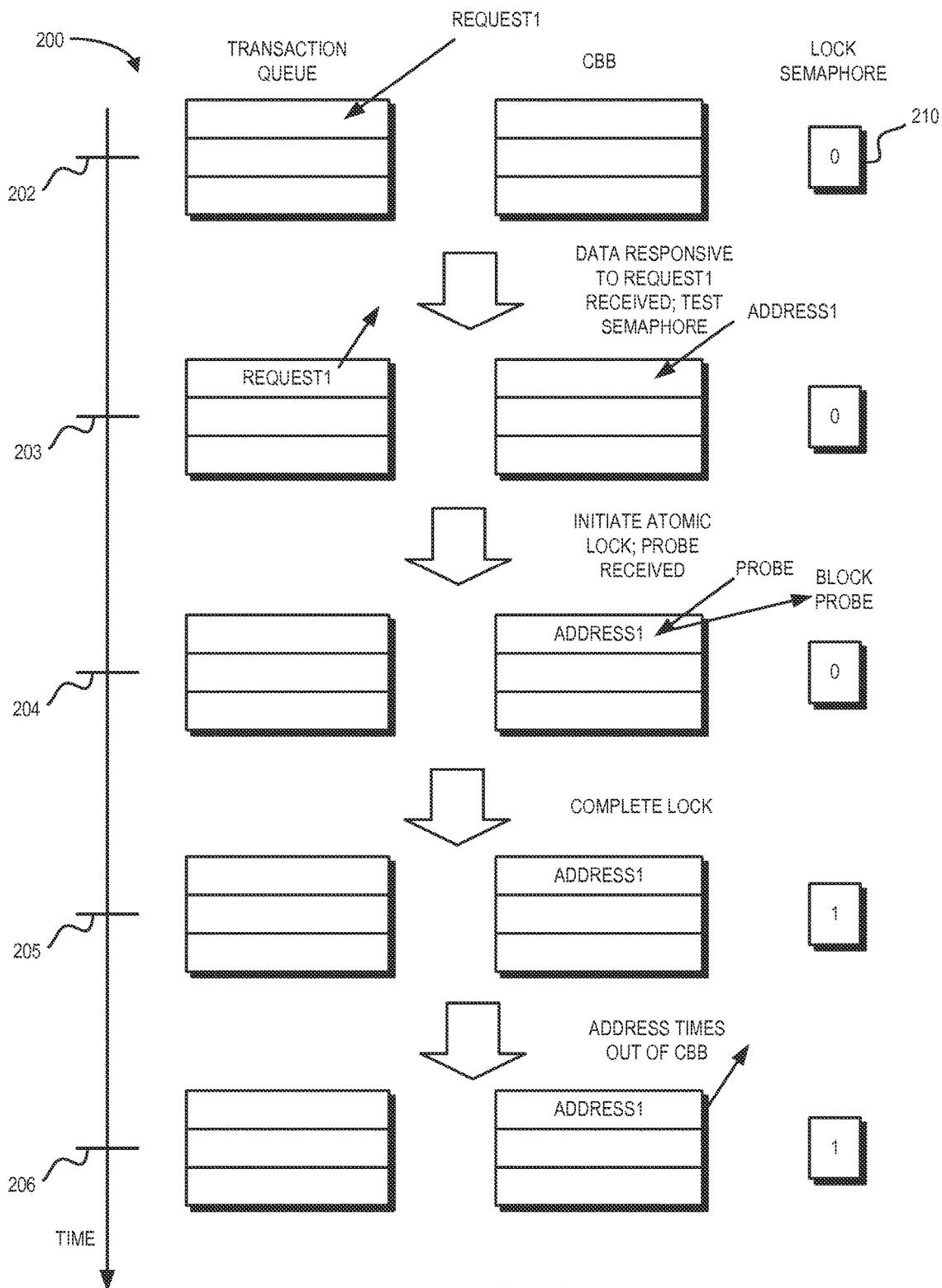
FIG. 2 is a diagram illustrating a timeline showing an example operation of a contention blocking buffer of the processing system of FIG. 1 in accordance with some embodiments.

FIG. 2 illustrates a timeline 200 showing an example operation of the CBB 111 at the processing system 100 in accordance with some embodiments of the present disclosure. The timeline 200 illustrates the contents of a portion of the transaction queue 126, a portion of the CBB 111, and a semaphore 210 corresponding to a memory location, designated "Memory Location 1", associated with a memory address designated "Address1."

In the illustrated example, at time 202 a request (designated "Request1") for the data at Memory Location 1 is received by the caching agent 120. In response, the controller 125 stores Request 1 at the transaction queue 126. The semaphore 210 indicates that Memory Location 1 is in an unlocked (clear) state. Between time 202 and time 203 the caching agent 120 receives data in response to Request 1, indicating that the processor core 105 has been granted exclusive ownership of Memory Location 1. In response, the controller 125 provides the data to the processor core 105 for storage at the cache 115. In addition, at time 203 the controller 125 removes Request1 from the transaction queue 126 and stores Address1 at the CBB 111. Further, the processor core 105 tests the semaphore 210 and determines that it is in the clear state, indicating that the memory region that includes the memory location has not been locked by software executing at another processor core. Accordingly, between time 203 and time 204 the processor core 105 initiates the locking operation for the semaphore 210. In addition, between time 203 and time 204 the controller 125 receives from the home agent 135 a probe for Memory Location 1. The controller 125 determines that Address1 is stored at the CBB 111 and therefore blocks the probe at time 204. This prevents the processor core that caused the generation of the probe from erroneously taking ownership of Memory Location 1.

Between time 204 and time 205 the locking operation for the semaphore 210 is completed. Accordingly, at time 205 the semaphore 210 is in the locked state. Accordingly, prior to executing critical sections of software programs that access a memory region associated with the semaphore 210, the other processor cores 106-108 will test the semaphore 210 and determine it is in the locked state. The processor cores 106-108 will therefore delay execution of the critical section of code until the semaphore 210 is returned to the unlocked state. Between time 205 and time 206 the timer at controller 125 associated with Address1 reaches a threshold value. Accordingly, at time 206 the controller 125 removes Address1 from the CBB 111. Thus, probes for Memory Location 1 are no longer blocked by the controller 125.

Figure 3:
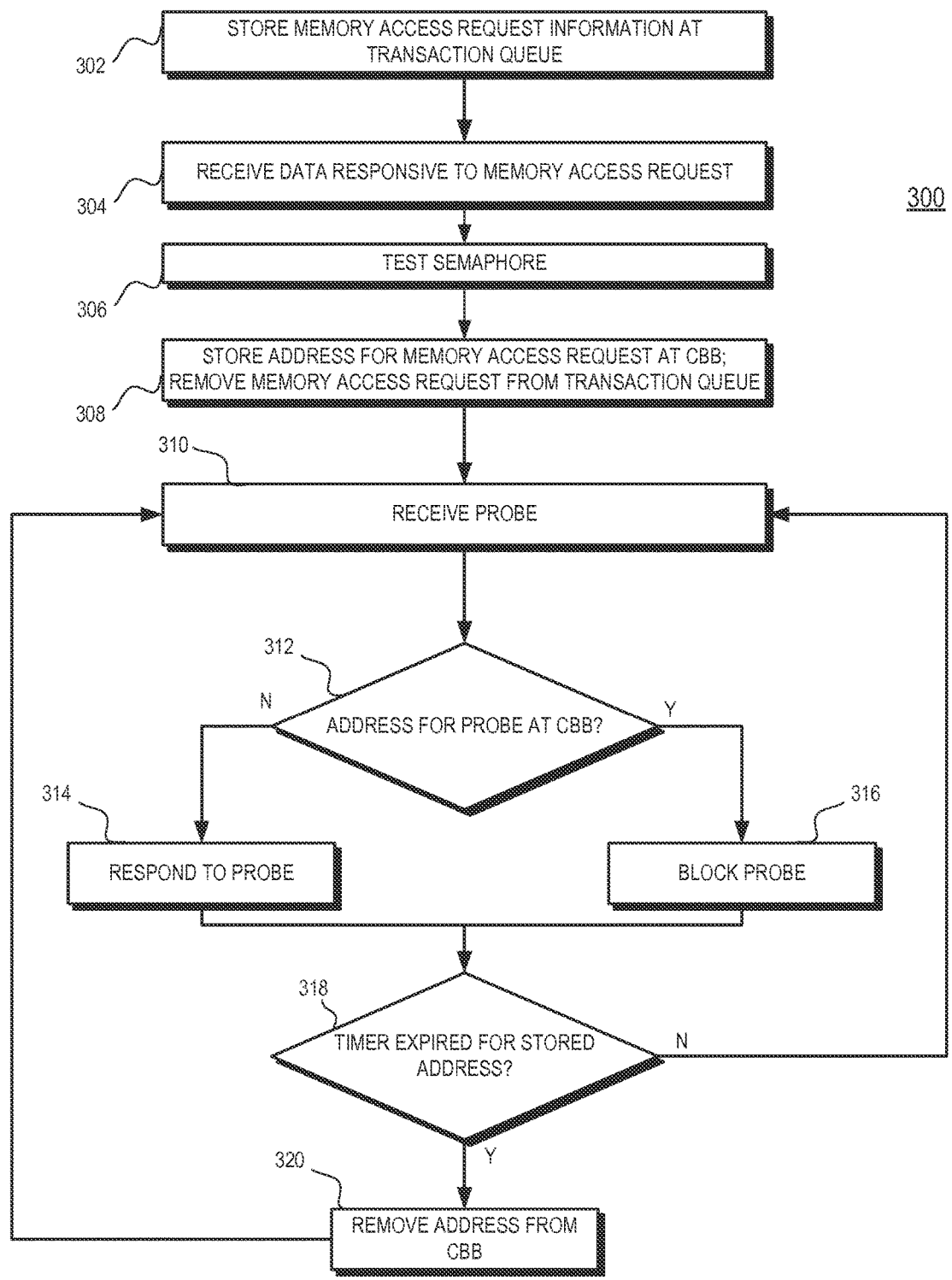
FIG. 3 is a flow diagram illustrating a method of blocking probes to prevent memory contention at a processing system in accordance with some embodiments.

FIG. 3 illustrates a flow diagram of a method 300 of blocking probes to prevent memory contention at a processing system in accordance with some embodiments. For purposes of illustration, the method 300 is described in the context of its application at the processing system 100 with respect to the caching agent 120 associated with the processor core 105. At block 302 the controller 125 receives a read memory access request and in response stores information representing the memory access request at an entry of the transaction queue 126, initializes a timer associated with the entry, and begins periodic adjustment of the timer. At block 304 the caching agent 120 receives data responsive to the memory access request. At block 306 the processor core 105 periodically tests the semaphore associated with the memory region being accessed until the semaphore is in the clear state. Accordingly, at block 308 the controller 125 stores the memory address associated with the memory access request at the CBB 111. In addition, the controller 125 removes the information representing the memory access request from the transaction queue 126.

At block 310 the caching agent 120 receives a probe from the home agent 135. In response, at block 312 the controller 125 determines if the memory address associated with the probe is stored at the CBB 111. If so, the controller 125 blocks the probe at block 316. If the memory address is not stored at the CBB 111, the controller 125 provides the probe to the processor core 105, which responds to the probe at block 314. At block 318 the controller 125 determines if the timer has expired (e.g. reached a threshold value) for an address stored at the CBB 111. If not, the method flow returns to block 310. If a timer has expired, the controller 125 removes the corresponding address from the CBB 111 at block 320 and the method flow returns to block 308.

In some embodiments, at least some of the functionality described above may be implemented by one or more processor cores executing one or more software programs tangibly stored at a computer readable medium, and whereby the one or more software programs comprise instructions that, when executed, manipulate the one or more processor cores to perform one or more of the functions described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 4:
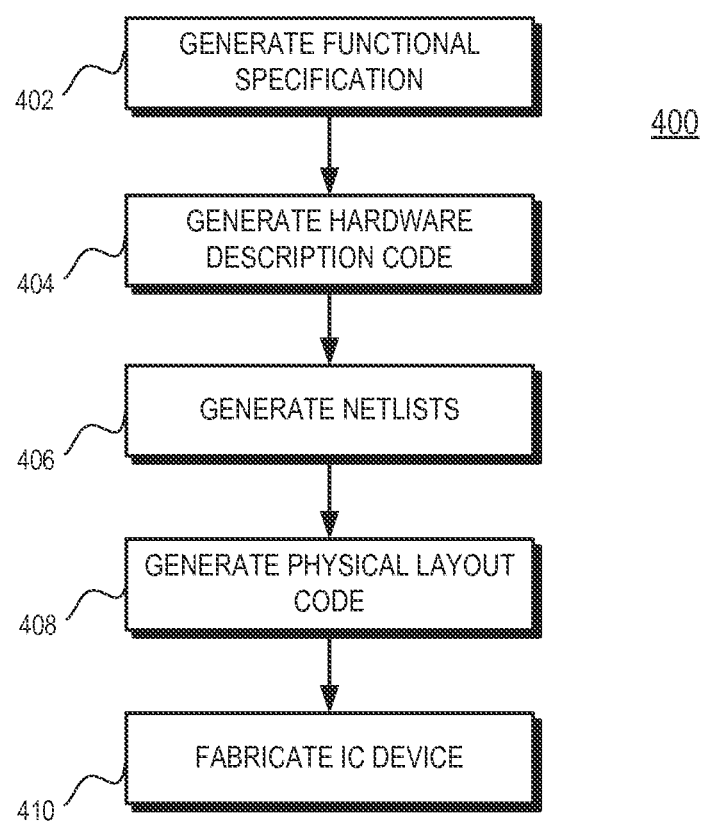
FIG. 4 is a flow diagram illustrating a method for designing and fabricating an integrated circuit device implementing at least a portion of a component of a processing device in accordance with some embodiments.

FIG. 4 is a flow diagram illustrating an example method 400 for the design and fabrication of an IC device implementing one or more aspects of the disclosed embodiments. The code generated for each of the following processes is stored or otherwise embodied in computer readable storage media for access and use by the corresponding design tool or fabrication tool.

At block 402 a functional specification for the IC device is generated. The functional specification (often referred to as a micro architecture specification (MAS)) may be represented by any of a variety of programming languages or modeling languages, including C, C++, SystemC, Simulink, or MATLAB.

At block 404, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 406 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 408, one or more EDA tools use the netlists produced at block 406 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 410, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   maintaining a set of memory addresses at a buffer responsive to memory access requests generated by a processor core;
   receiving, at the processor core, a probe indicating a request to access a memory location associated with a memory address;
   blocking the probe responsive to the memory address being stored at the buffer,
   issuing a memory access request for data at the memory location from the processor core;
   storing the memory address at the buffer in response to receiving the data identified by the memory access request;
   storing, at a queue of the processor core, a transaction representing the memory access request, the queue separate from the buffer;
   discarding the transaction from the queue in response to receiving the data; and
   maintaining the memory address at the buffer after discarding the transaction from the queue.

2. The method of claim 1, further comprising locking a semaphore associated with the memory location while the memory address is stored at the buffer.

3. The method of claim 1, further comprising:
   discarding the memory address from the buffer in response to expiration of a timer.

4. The method of claim 1, wherein blocking the probe comprises delaying a response to the probe for a period of time.

5. The method of claim 1, wherein blocking the probe comprises suppressing a response to the probe.

6. A method, comprising:
   maintaining a set of memory addresses at a plurality of buffers based on data received responsive to memory access requests generated by a plurality of processor cores; and
   blocking probes indicating requests to access memory locations in response to memory addresses associated with the probes being stored at the plurality of buffers;
   storing the memory addresses at the plurality of buffers in response to receiving, at the processor cores, data responsive to memory access requests generated by the processor cores;
   storing at a plurality of queues a plurality of transactions representing the memory access requests;
   storing at a plurality of queues a plurality of transactions representing the memory access requests;
   discarding one of the plurality of transactions from the plurality of queues in response to receiving data corresponding to the one of the plurality of transactions; and
   maintaining at the plurality of buffers a memory address associated with the one of the plurality of transactions after discarding the one of the plurality of transactions from the plurality of queues.

7. A device, comprising:
   a processor core to issue a memory access request for data at a memory location;
   a buffer to store a memory address associated with data received by the processor core;
   a controller to block a received probe requesting ownership of the memory location associated with the memory address responsive to the memory address being stored at the buffer, and to store the memory address at the buffer in response to receiving the data responsive to the memory access request; and
   a queue to store a transaction representing the memory access request, the queue separate from the buffer;
   wherein:
      the queue is to discard the transaction from the queue in response to receiving the data; and
      the buffer is to maintain the memory address at the buffer after discarding the transaction from the queue.

8. The device of claim 7, wherein the buffer is to discard the memory address from the buffer in response to expiration of a timer.

9. The device of claim 8, wherein the controller is to block the probe by delaying a response to the probe for a period of time.

10. The device of claim 7, wherein the controller is to block the probe by suppressing a response to the probe.

11. The device of claim 7, wherein the processor core is to lock the memory location while the memory address is stored at the buffer.

12. A computer readable medium storing code to adapt at least one computer system to perform a portion of a process to fabricate at least part of a processor comprising:
   a processor core to issue a memory access request for data at a memory location;
   a buffer to store a memory address associated with data received by the processor core;

a controller to block a received probe requesting ownership of a memory location associated with the memory address responsive to the memory address being stored at the buffer; and to store the memory address at the buffer in response to receiving the data responsive to the memory access request; and a queue to store a transaction representing the memory access request, the queue separate from the buffer;

wherein:

the queue is to discard the transaction from the queue in response to receiving the data; and the buffer is to maintain the memory address at the buffer after discarding the transaction from the queue.

13. The computer readable medium of claim 12, wherein the buffer is to discard the memory address from the buffer in response to expiration of a timer.

* * * * *